United States Patent
Zimmermann et al.

(10) Patent No.: US 6,704,310 B1
(45) Date of Patent: Mar. 9, 2004

(54) HEADER ENCODING METHOD AND APPARATUS FOR PACKET-BASED BUS

(75) Inventors: Remy Zimmermann, Belmont, CA (US); Sergio Maggi, San Mateo, CA (US)

(73) Assignee: Logitech Europe, S.A., Romanel-sur-Morges (CH)

( * ) Notice: Subject to any disclaimer, the term of this patent is extended or adjusted under 35 U.S.C. 154(b) by 0 days.

(21) Appl. No.: 09/343,948

(22) Filed: Jun. 30, 1999

(51) Int. Cl.[7] ............................................. H04L 12/56
(52) U.S. Cl. ................................... 370/389; 348/207.1
(58) Field of Search ................................ 370/419, 389, 370/422, 423, 464, 473, 474, 475, 476; 710/100, 300, 306, 313, 314; 348/207.1, 239.1, 211.3, 211.1

(56) References Cited

U.S. PATENT DOCUMENTS

| | | | |
|---|---|---|---|
| 4,641,307 A | | 2/1987 | Russell |
| 4,774,706 A | | 9/1988 | Adams |
| 5,060,229 A | | 10/1991 | Tyrrell et al. |
| 5,483,287 A | | 1/1996 | Siracusa |
| 5,646,941 A | * | 7/1997 | Nishimura et al. ......... 370/389 |
| 5,757,416 A | | 5/1998 | Birch et al. |
| 5,936,967 A | | 8/1999 | Baldwin et al. |
| 5,946,467 A | | 8/1999 | Pathakis et al. |
| 6,021,129 A | * | 2/2000 | Martin et al. ................ 370/389 |
| 6,084,888 A | | 7/2000 | Watanabe et al. |
| 6,097,499 A | * | 8/2000 | Casey et al. ................ 358/1.16 |
| 6,157,637 A | | 12/2000 | Galand et al. |
| 6,172,989 B1 | * | 1/2001 | Yanagihara et al. ......... 370/473 |
| 6,184,936 B1 | * | 2/2001 | Hu .............................. 348/453 |
| 6,243,395 B1 | * | 6/2001 | Fujimori et al. ............ 370/466 |
| 6,256,350 B1 | * | 7/2001 | Bishay et al. .......... 375/240.21 |
| 6,266,727 B1 | * | 7/2001 | Smyers et al. .............. 710/105 |
| 6,273,535 B1 | * | 8/2001 | Inoue et al. .................... 347/2 |
| 6,389,029 B1 | * | 5/2002 | McAlear ..................... 370/402 |
| 6,400,280 B1 | * | 6/2002 | Osakabe ................ 340/825.25 |
| 6,446,155 B1 | * | 9/2002 | Maggi et al. ............... 710/313 |
| 6,532,232 B1 | * | 3/2003 | Goodwin, III .............. 370/389 |
| 2002/0039139 A1 | * | 4/2002 | Hsu et al. .................... 348/222 |
| 2002/0050518 A1 | * | 5/2002 | Roustaei ..................... 235/454 |
| 2003/0030729 A1 | * | 2/2003 | Prentice et al. .......... 348/220.1 |

* cited by examiner

*Primary Examiner*—Chi Pham
*Assistant Examiner*—Derrick W Ferris
(74) *Attorney, Agent, or Firm*—Townsend and Townsend and Crew LLP

(57) ABSTRACT

A method and apparatus for transmitting image data over a packet-based bus. The invention essentially supports multiple pipes within a single packet, thus utilizing a single set of pipe interface hardware. Each of the pipes within a packet has it's own header, and any particular packet can have 0, 1, 2 or more headers.

10 Claims, 3 Drawing Sheets

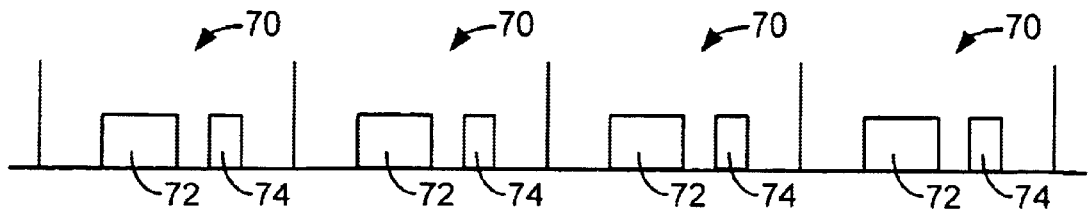
FIG. 2
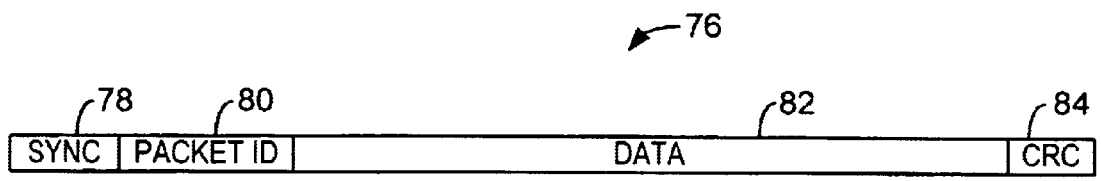
FIG. 3
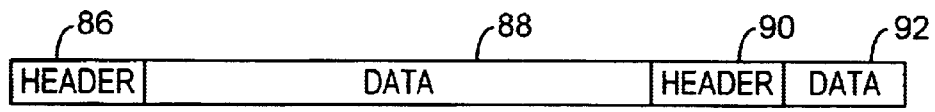
FIG. 4
Header fields:
| Bits | 31 | 30 | 29-24 | 23-16 | 15-10 | 9-0 |
|---|---|---|---|---|---|---|
| Fields | SYS | ERR | TYPE | INFO | RESERVED | LENGTH |
FIG. 5

HEADER ENCODING METHOD AND APPARATUS FOR PACKET-BASED BUS

BACKGROUND OF THE INVENTION

The present invention relates to any packet-based bus, such as the universal serial bus (USB), and in particular to video transmissions over such a bus.

The USB supports functional data and control exchange between the USB host and a USB device as a set of either unidirectional or bidirectional pipes. USB data transfers take place between host software and a particular endpoint on a USB device. Such associations between the host software and a USB device endpoint are called pipes. In general, data movement through one pipe is independent from the data flow in any other pipe. A given USB device may have many pipes. As an example, a given USB device could have an endpoint that supports a pipe for transporting data to the USB device and another endpoint that supports a pipe for transporting data from the USB device.

The USB architecture comprehends four basic types of data transfers:

Control Transfers: Used to configure a device at attach time and can be used for other device-specific purposes, including control of other pipes on the device.

Bulk Data Transfers: Generated or consumed in relatively large and bursty quantities and have wide dynamic latitude in transmission constraints.

Interrupt Data Transfers: Used for characters or coordinates with human-perceptible echo or feedback response characteristics.

Isochronous Data Transfers: Occupy a prenegotiated amount of USB bandwidth with a prenegotiated delivery latency. (Also called streaming real time transfers).

A pipe supports only one of the type of transfers described above for any given device configuration.

Control data is used by the USB System Software to configure devices when they are first attached. Other driver software can choose to use control transfers in implementation-specific ways. Data delivery is lossless.

Bulk data typically consists of larger amounts of data, such as that used for printers or scanners. Bulk data is sequential. Reliable exchange of data is ensured at the hardware level by using error detection in hardware and invoking a limited number of retries in hardware. Also, the bandwidth taken up by bulk data can vary, depending on other bus activities.

A small, limited-latency transfer to or from a device is referred to as interrupt data. Such data may be presented for transfer by a device at any time and is delivered by the USB at a rate no slower than is specified by the device.

Interrupt data typically consists of event notification, characters, or coordinates that are organized as one or more bytes. An example of interrupt data is the coordinates from a pointing device. Although an explicit timing rate is not required, interactive data may have response time bounds that the USB must support.

Isochronous data is continuous and real-time in creation, delivery, and consumption. Timing-related information is implied by the steady rate at which isochronous data is received and transferred. Isochronous data must be delivered at the rate received to maintain its timing. In addition to delivery rate, isochronous data may also be sensitive to delivery delays. For isochronous pipes, the bandwidth required is typically based upon the sampling characteristics of the associated function. The latency required is related to the buffering available at each endpoint.

A typical example of isochronous data is voice. If the delivery rate of these data streams is not maintained, dropouts in the data stream will occur due to buffer or frame underruns to overruns. Even if data is delivered at the appropriate rate by USB hardware, delivery delays introduced by software may degrade applications requiring real-time turn-around, such as telephony-based audio conferencing.

The timely delivery of isochronous data is ensured at the expense of potential transient losses in the data stream. In other words, any error in electrical transmission is not corrected by hardware mechanisms such as retries. In practice, the core bit error rate of the USB is expected to be small enough not to be an issue. USB isochronous data streams are allocated a dedicated portion of USB bandwidth to ensure that data can be delivered at the desired rate. The USB is also designed for minimal delay of isochronous data transfers.

USB bandwidth is allocated among pipes. The USB allocates bandwidth for some pipes when a pipe is established. USB devices are required to provide some buffering of data. It is assumed that USB devices requiring more bandwidth are capable of providing larger buffers. The goal for the USB architecture is to ensure that buffering-induced hardware delay is bounded to within a few milliseconds.

The USB's bandwidth capacity can be allocated among many different data streams. This allows a wide range of devices to be attached to the USB. For example, telephony devices ranging from 1B+D all the way up to T1 capacity can be accommodated. Further, different device bit rates, with a wide dynamic range, can be concurrently supported.

The USB Specification defines the rules for how each transfer type is allowed access to the bus.

A USB pipe is an association between an endpoint on a device and software on the host. Pipes represent the ability to move data between software on the host via a memory buffer and an endpoint on a device. There are two different, mutually exclusive, pipe communication modes:

Stream: Data moving through a pipe has no USB-defined structure.

Message: Data moving through a pipe has some USB-defined structure.

The USB does not interpret the content of data it delivers through a pipe. Even though a message pipe requires that data be structured according to USB definitions, the content of the data is not interpreted by the USB.

Additionally, pipes have the following associated with them:

A claim on USB bus access and bandwidth usage.

A transfer type.

The associated endpoint's characteristics, such as directionality and maximum data payload sizes. The data payload is the data that is carried in the data field of a data packet within a bus transaction.

Some video cameras use the bulk transfer mode for image data. Other video cameras establish multiple pipes, each with their own interface hardware, for sending image data and control and synchronization information.

SUMMARY OF THE INVENTION

The present invention provides a method and apparatus for transmitting image data over a packet-based bus. The invention essentially supports multiple pipes within a single packet, thus utilizing a single set of pipe interface hardware.

Each of the pipes within a packet has it's own header, and any particular packet can have 0, 1, 2 or more headers.

When two or more headers are used, a first header identifies the type and length of the following block of data, and is followed by a first block of image related data. At least a second header identifies a type and length of a second following block of data.

In one embodiment, the bus is a universal serial bus and the single packet is one frame of a isochronous data transfer. The number of headers and blocks of image-related data can vary from one frame to the next. The image-related data can be image data itself, or related data such as synchronization or control data.

One advantage of the present invention is that it accommodates the elimination of a large frame buffer memory in a camera. Instead, the data can be sent as it is accumulated, with each new accumulated portion of data being provided in the new header. Thus, even as a first header is established with a given length of data and that data is packed into the packet, if new image is received during the packing, it can also be sent in the same packet with a second header.

The invention also provides the advantage of allowing the collection of statistical information to enable user control at the camera before compression, while limiting the required bandwidth of the USB bus by sharing a USB packet with the image data.

For a further understanding of the nature and advantages of the invention, reference should be made to the following description taken in conjunction with the accompanying drawings.

BRIEF DESCRIPTION OF THE DRAWINGS

FIG. 2 is a diagram of a USB bus with multiple pipes.

FIG. 3 is a diagram of a USB packet.

FIG. 4 is a diagram of the data field of a USB packet in accordance with the present invention.

FIG. 5 is a diagram of the header fields of one of the headers of FIG. 4.

DESCRIPTION OF THE SPECIFIC EMBODIMENTS

Figure 1:
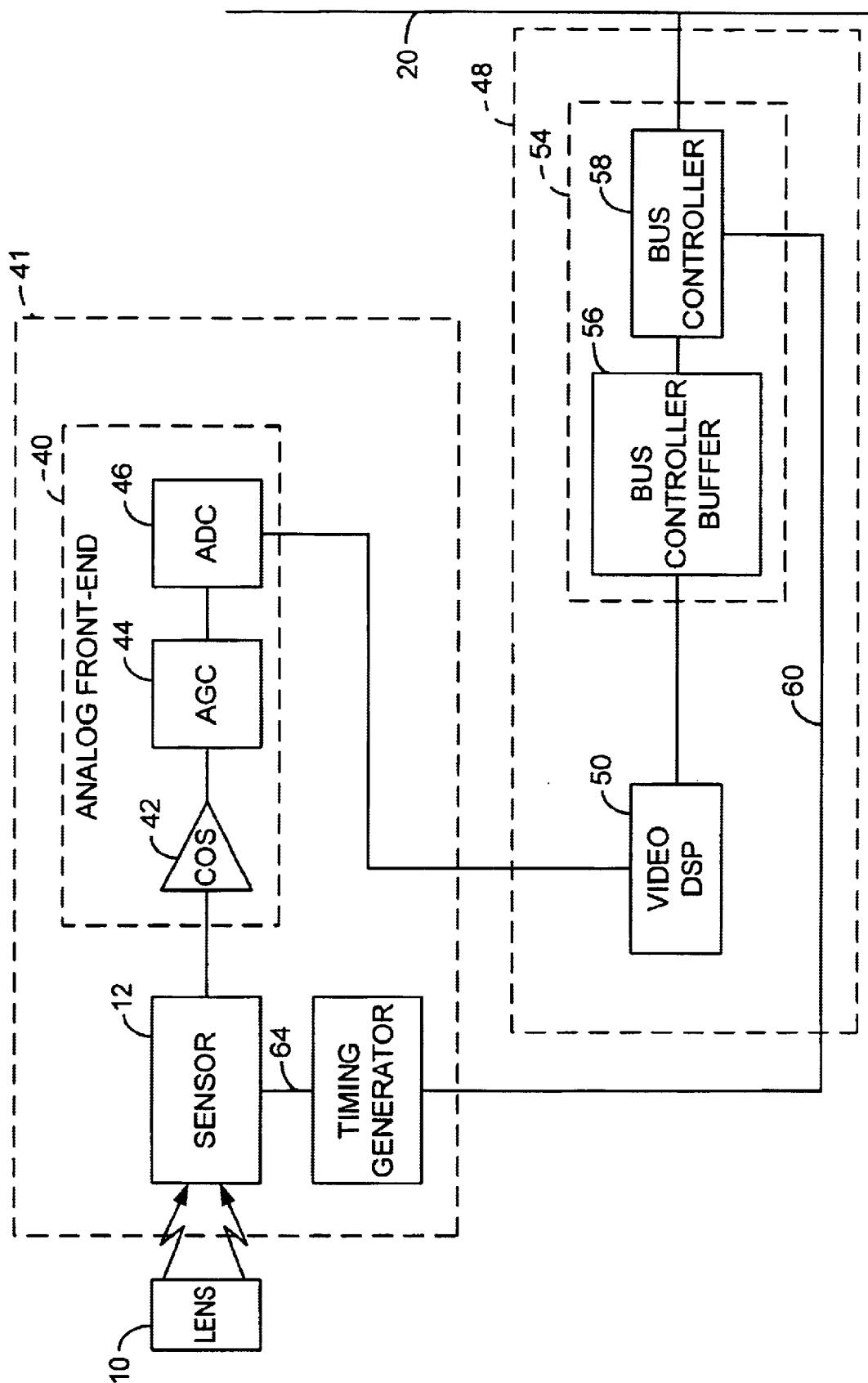
FIG. 1 is a block diagram of a video camera incorporating the present invention.

FIG. 1 is a block diagram of a video camera supporting the present invention. This system includes a lens 10 and a sensor array 12, and is connected to a USB 20. Sensor array 12 can be a CMOS sensor, a CCD sensor, or any other type of sensor.

The signals from the sensor are provided to an analog front end 40 which includes a differential amplifier or correlated double sampler (CDS) 42, which provides the analog signals to an automatic gain control (AGC) circuit 44. The data is then provided to an analog-to-digital converter (ADC) 46. In one embodiment, the sensor and analog front end are integrated on a single chip.

The digitized signals, rather than being stored in a frame buffer memory as in the prior art, are then provided directly to a digital processing circuit 48. They are first provided to a video digital signal processor 50 which performs the compression, cropping, scaling and other functions on the data, as well as digital filtering.

Data from video DSP 50 is provided to a bus interface 54 which includes a bus controller buffer 56 and a bus controller 58. Preferably, bus controller buffer 56 is capable of storing two USB frames at the maximum possible rate, or 2 Kbytes. Depending upon the frame rate, compression rate, etc., this may typically vary up to 10 lines, or even to 15–20 lines if decimation is done.

Bus controller 58 provides a control signal on a line 60 to a timing generator 62. Timing generator 62 provides clocking signals on line 64 to sensor chip 12. Clocking signals 64 include the horizontal and vertical transfer pulses. In one embodiment, the analog front end 40 and the timing generator 62 are integrated onto the same semiconductor chip substrate 41 as sensor array 12. The elimination of the frame buffer allows this single chip to connect directly to the digital processing circuitry. This allows a more compact, less expensive video camera to be built.

USB

FIG. 2 illustrates a number of USB frames 70. Each has two pipelines, 72 and 74. Each separate pipeline typically requires separate circuitry for providing the required ID, etc. In some digital cameras, this method is used to provide two pipelines, one for data information and another for control information. Other digital cameras will instead use the bulk transfer method over the USB.

FIG. 3 is a diagram of the USB packet 76. The packet starts with a sync field 78, followed by a packet ID 80. This is followed by a data field 82 and then a CRC code 84.

The present invention provides, in data field 82 of the USB packet, a block as illustrated in FIG. 4. This includes a header 86 followed by data 88. An additional header 90 is shown in the embodiment of FIG. 4, followed by additional data 92. The additional header can designate data of a different type, such as controller synchronization information. Alternately, the additional header can provide additional image data. One example of this would be where additional image data is received after the first header has been constructed, but before transmission of data 88 has been completed. This allows an additional header to pick up more data 92 and send it in the same USB packet.

FIG. 5 illustrates the header field used according an embodiment of the present invention. Below is a brief description of the different fields.

| Field | Description |
| --- | --- |
| LENGTH | Length of the data following this header |
| RESERVED | Reserved. Must be 0. |
| INFO | Type dependent info field. Allows type informatin to be embedded in the header. |
| TYPE | Type of the attached data. See below. |
| ERR | Error happened in the data stream. Error handling is data handler dependent. |
| SYS | System tag. See below. |

The SYS field is a single bit which indicates whether the type of data is system or data.

System headers do not convey data. They are used to group data or convey synchronization information. Data headers convey data to the host. The corresponding data handler is based on the type field.

The ERR field indicates whether an error has occurred. For example, where there is an overflow of the buffer, an error will be indicated. When an error occurs, the data is discarded and the state machine collecting the data is reset.

The TYPE field sets forth the following types of information:

| Name | Type | Info | Description |
| --- | --- | --- | --- |
| T_FRAME | 0x00 | 0x01: Start of Frame | This header delimits information belonging to a video frame. |
| | | 0x02: End of Frame | If multiple data types are transmitted for a video frame, this header encloses all the data types. |
| T_SYNCHRO | 0x01 | 0x01: Command Done | This header informs the host that the last command sent to the device took effect. |
| RESERVED | 0x02–0x3F | | Reserved. |

The T_SYNCHRO field can be used, for example, when a command has been sent to the camera and it is desired to know to which data that command has been applied. For example, an instruction may be sent to change the integration time of the sensor. It is vital to know when this has occurred so that the host knows which data corresponds to the sensor having light exposed for a longer time or shorter time. It is particularly important to avoid having such a change take place in the middle of a frame.

The INFO field allows the indication of the start of the frame or the end of a frame. This eliminates the need to use a data field for such indications, instead allowing the embedding of this in a header. Some prior art cameras would send an empty packet to delineate between frames, for example.

The TYPE id field value is inferred from the device data types descriptor (if defined in the class descriptor). This is the index of the corresponding data type descriptor. The data type descriptor describes the content of the corresponding data stream.

The SYS field indicates that data is being sent, the following types of data are defined:

| Name | Type | Info | Description |
| --- | --- | --- | --- |
| T_VIDEO | 0x00 | N/A | Data is video data. |
| T_SLICE | 0x01 | N/A | Data is control information for data. |
| T_STATA | 0x02 | N/A | Data is statistics of on video frame. |
| RESERVED | 0x03–0x3F | | Reserved. |

The statistical information can provide data on the image content. For example, the image might be too bright or too dark. Thus, red, blue and green accumulators are provided to allow monitoring of this and adjusting of the white balancing. The statistical data is important, because it can be collected before user controls are applied in one embodiment, and before the data is compressed and decompressed at the host, thus assuring accurate data is provided. Below are preferred fields for the statistic information.

| Offset | Size | Field | Description |
| --- | --- | --- | --- |
| 0x00 | 0x02 | WbGreenAcc | |
| 0x02 | 0x02 | WbGMRAcc | |
| 0x04 | 0x02 | WbGMBAcc | |
| 0x08 | 0x02 | WbPixel Count | |
| 0x0A | 0x02 | AgcZone1Acc | |
| 0x0C | 0x02 | AgcZone2Acc | |
| 0x0E | 0x02 | AgcZone3Acc | |
| 0x10 | 0x01 | AgcShifts | |
| 0x11 | 0x01 | SatPixelCount | |

Figure 6:
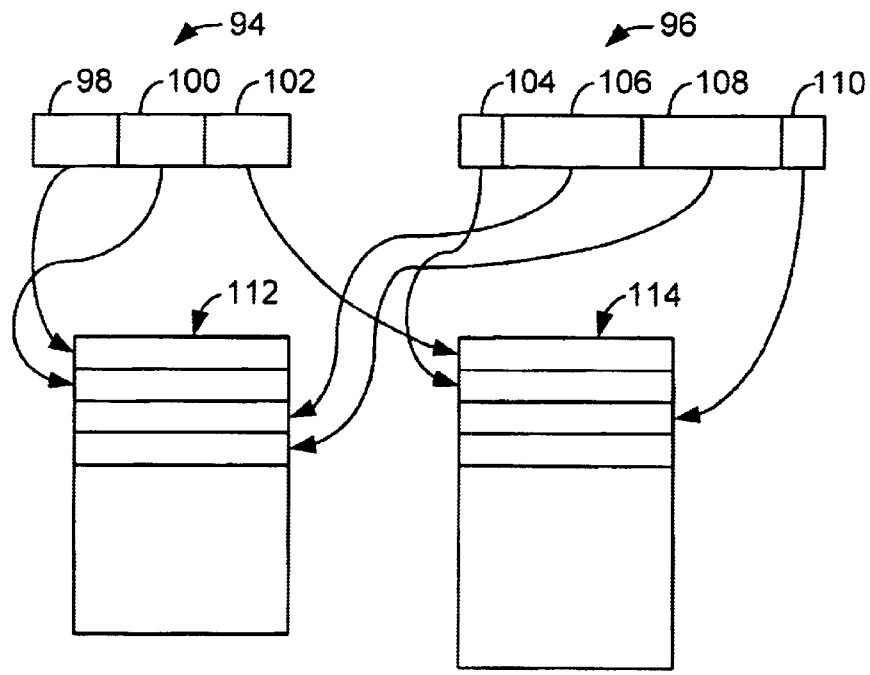
FIG. 6 is a diagram illustrating the removal of received data and its allocation to different portions of memory in accordance with the header fields of the present invention.

FIG. 6 illustrates the reception of the data according to the present invention at the host side of the USB. Shown are two USB packets 94 and 96. The first packet shows three separate data fields 98, 100 and 102, each of which would have its own header. Similarly, packet 96 has fields 104, 106, 108 and 110, each of which has its own header. Also shown are two memory locations or buffers 112 and 114. For example, a buffer 112 might be for image data, while a buffer 114 could be for statistics or synchronization data. As is shown by the different arrows, the data can be allocated to the appropriate next position in the respective buffers 112 and 114 by reading their corresponding headers and determining where the data belongs. This provides improved flexibility and maximum usage of the USB packet in an isochronous transfer.

The method of data reception includes the following steps:
1. receiving a single packet from the bus.
2. decoding a first header.
3. directing a first block of data associated with the first header to a first portion of a memory in response to the first header.
4. determining a location of a second header from a length field in the first header.
5. decoding the second header.
6. directing a second block of data associated with the second header to a second portion of a memory in response to the second header.

Figure 7A:
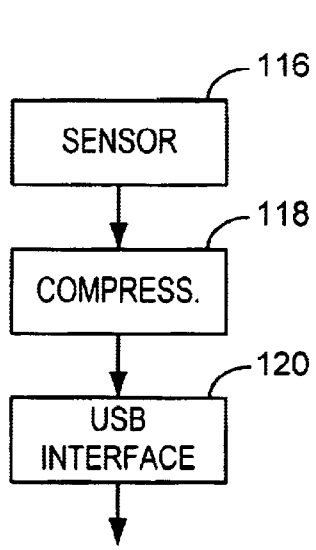
FIGS. 7A and 7B are block diagrams of different embodiments of a camera system incorporating the invention.
Figure 7B:
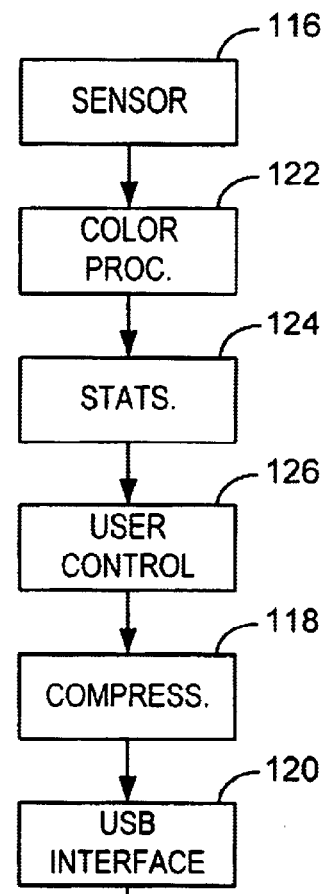

FIGS. 7A and 7B are block diagrams of embodiments of two different cameras according to the present invention. FIG. 7A shows a first, simple camera having a sensor 116 connected to compression circuitry 118 which is then connected to a USB interface 120.

FIG. 7B shows a more complicated embodiment in which a sensor 116 is also coupled to compression circuit 118 and USB interface 120, but with intermediate circuitry. In particular, a color processing circuit 122 is provided, followed by a statistics collection circuit 124 and user control circuitry 126.

As can be seen, the invention allows the use of an isochronous USB pipeline with a single hardware interface circuit to emulate multiple pipelines. This can be used to transmit not only frame information in multiple blocks to maximize throughput, but also to provide statistics information at the sensor side, as well as other control information. The present invention can be extended to different types of data than those currently set forth.

At the receiving end, the data with the different headers can be demultiplexed as described with respect to FIG. 6. The first header is decoded, obtaining the length information, and then the processor can look ahead to the next header while the first header finishes its decoding and allocation of the data to the appropriate location. Thus, high speed demultiplexing can be accomplished.

The invention allow the maximizing of the usage of an allocated pipe. Control information, instead of requiring a separate pipe where it may not always be used, can instead be inserted when needed, taking a proportion of the packet for the image frame data.

Below is an example of a transfer illustrating the operation of the present invention:

| Ref. | Value | Description | Comment: |
|------|-------|-------------|----------|
| 1 | SOF | USB SOF | |
| 2 | 0x80010000 | Header T_FRAME, Start of frame | |
| 3 | 0x00000004 | Header Data (Handler 0) | |
| 4 | 0x00 0x01 0x02 0x03 | Data | |
| 5 | 0x01000002 | Header Data (Handler 1) | Multiple headers per USB frame are valid |
| 6 | 0xFF 0xFE | Data | |
| 7 | SOF | USB SOF | |
| 8 | 0x00000006 | Header Data (Handler 0) | |
| 9 | 0x04 0x05 0x06 0x07 0x08 0x09 | Data | |
| 10 | SOF | USB SOF | |
| 11 | SOF | USB SOF | It is valid to have an empty USB frame. |
| 12 | 0x01000002 | Header Data (Handler 1) | |
| 13 | 0xFD 0xFC | Data | |
| 14 | 0x00000001 | Header Data (Hander 0) | The order of data header is not fixed |
| 15 | 0x0A | Data | |
| 16 | SOF | USB SOF | |
| 17 | 0x01000000 | Header Data (Handler 1) | A header with no data is valid |
| 18 | 0x80020000 | Header T_FRAME, End of frame | |
| 19 | 0x80010000 | Header T_FRAME, Start of frame | |
| 20 | 0x01000000 | Header Data (Handler 1) | The next video frame can start in the same USB frame as the previous frame. |

The method and apparatus of the present invention provides a number of advantages. First, video frame synchronization is provided by allowing the headers to indicate the start and end of a frame, for example. Secondly, data multiplexing is provided on a single isochronous USB pipeline. Third, error checking is provided by the field in the header. Finally, extensibility to different types of control information or data is accommodated.

As will be understood by those of skill in the art, the present invention may be embodied in other specific forms without departing from the essential characteristics thereof. Accordingly, the foregoing description is intended to be illustrative, but not limiting, of the scope of the invention which is set forth in the following claims.

What is claimed is:

1. An apparatus for transmitting image data over a packet-based bus, comprising:
   a buffer for accumulating image-related data;
   a bus controller, coupled to said buffer, for providing, as data within each packet, a variable number of headers ranging from zero to a plurality of headers, at least one of said packets having at least two headers;
   each header identifying at least a type and length of a following block of data,
   each header being followed by a block of image-related data;
   said bus controller being configured to transmit said single packet over said packet-based bus;
   an image sensor;
   a color processing circuit coupled to said image sensor;
   a statistics gathering circuit coupled to said color processing circuit;
   a user control circuit coupled to said color processing circuit;
   a compression circuit having an input coupled to said color processing circuit and an output coupled to said buffer;
   wherein each header comprises:
      a system field indicating whether the block of data is image data or synchronization information;
      a type field indicating a type of image data; and
      a length field.

2. The apparatus of claim 1 wherein each header further comprises:
   an error bit indicating an error in the data;
   an information field providing type-dependent data.

3. The apparatus of claim 1 wherein possible types of image data indicated in said type field include:
   video data; and
   statistics on a video frame.

4. A method for transmitting image data over a packet-based bus, comprising:
   providing, as data within each packet, a variable number of headers ranging from zero to a plurality of headers, at least one of said packets having at least two headers;
   each header identifying at least a type and length of a following block of data,
   each header being followed by a block of image-related data; and
   transmitting each packet over said packet-based bus;
   wherein each header comprises:
      a system field indicating whether the block of data is image data or synchronization information;
      a type field indicating a type of image data; and
      a length field.

5. The method of claim 4 wherein each header further comprises:
   an error bit indicating an error in the data;
   an information field providing type-dependent data.

6. The method of claim 4 wherein possible types of image data indicated in said type field include:
   video data; and
   statistics on a video frame.

7. A method for transmitting image data over a universal serial bus, comprising:
   providing, as data within at least one packet,
      (a) a first header identifying at least a type and length of a following block of data,
      (b) a first block of image-related data,
      (c) a second header identifying at least a type and a length of a following block of data,
      (d) a second block of image-related data;
   accumulating a portion of a frame of an image in a buffer;
   packing said portion of said frame into said single packet without waiting for a remainder of said frame; and
   transmitting said single packet in one frame of an isochronous data transfer;
   wherein said first and second blocks of image-related data are multiple pipes;

wherein a varying number of headers and following data are transmitted in packets in different frames;

wherein each of said headers includes
  a system field indicating whether the block of data is image data or synchronization information,
  a type field indicating a type of image data, and
  a length field;

wherein possible types of image data indicated in said type field include:
  video data, and
  statistics on a video frame.

8. An apparatus for transmitting image data over a packet-based bus, comprising:

a buffer for accumulating image-related data;

a bus controller, coupled to said buffer, for providing, as data within each packet, a variable number of headers ranging from zero to a plurality of headers, at least one of said packets having at least two headers;
  each header identifying at least a type and length of a following block of data,
  each header being followed by a block of image-related data, and said bus controller being configured to transmit said single packet over said packet-based bus;

wherein each header comprises:
  a system field indicating whether the block of data is image data or synchronization information;
  a type field indicating a type of image data; and
  a length field.

9. The apparatus of claim 8 wherein each header further comprises:

an error bit indicating an error in the data;

an information field providing type-dependent data.

10. The apparatus of claim 8 wherein possible types of image data indicated in said type field include:

video data; and statistics on a video frame.

* * * * *